US008526606B2

(12) United States Patent
Muthaiah

(10) Patent No.: US 8,526,606 B2
(45) Date of Patent: Sep. 3, 2013

(54) ON-DEMAND SECURE KEY GENERATION IN A VEHICLE-TO-VEHICLE COMMUNICATION NETWORK

(75) Inventor: Skanda N. Muthaiah, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 147 days.

(21) Appl. No.: 12/972,661

(22) Filed: Dec. 20, 2010

(65) Prior Publication Data

US 2012/0155636 A1 Jun. 21, 2012

(51) Int. Cl.
*H04L 9/00* (2006.01)

(52) U.S. Cl.
USPC ............................................. 380/44; 380/270

(58) Field of Classification Search
None
See application file for complete search history.

(56) References Cited

U.S. PATENT DOCUMENTS

| | | | | |
|---|---|---|---|---|
| 2004/0210757 A1* | 10/2004 | Kogan et al. | ................... | 713/182 |
| 2007/0222555 A1* | 9/2007 | Tengler et al. | ................. | 340/5.6 |
| 2007/0223702 A1* | 9/2007 | Tengler et al. | ................. | 380/270 |
| 2008/0219445 A1* | 9/2008 | Yato et al. | ..................... | 380/255 |
| 2009/0249074 A1* | 10/2009 | Madhavan et al. | ............ | 713/176 |
| 2009/0254754 A1* | 10/2009 | Bellur et al. | ................... | 713/176 |
| 2009/0271112 A1* | 10/2009 | Basnayake | ..................... | 701/213 |
| 2010/0290627 A1* | 11/2010 | Tsuji et al. | ..................... | 380/282 |
| 2011/0083011 A1* | 4/2011 | DiCrescenzo | ................ | 713/158 |
| 2011/0098877 A1* | 4/2011 | Stahlin et al. | ................... | 701/33 |
| 2011/0150212 A1* | 6/2011 | Spalka et al. | ................... | 380/44 |
| 2011/0302408 A1* | 12/2011 | McDermott et al. | .......... | 713/153 |
| 2012/0045059 A1* | 2/2012 | Fujinami | ....................... | 380/273 |
| 2012/0131350 A1* | 5/2012 | Atherton | ....................... | 713/186 |

* cited by examiner

*Primary Examiner* — Jeffrey Pwu
*Assistant Examiner* — Carlos Amorin

(57) ABSTRACT

A method is provided for generating on-demand cryptographic keys in a vehicle-to-vehicle communication system. At least one unique identifier is obtained relating to a user of the vehicle. The host vehicle generates cryptographic keys for encrypting, decrypting, and authenticating secured messages between the host vehicle and at least one remote vehicle in the vehicle-to-vehicle communication system. The cryptographic keys are generated as a function of the at least one unique identifier. A respective cryptographic key used to decrypt or encrypt messages communicated between the host vehicle and the at least one remote entity is temporarily stored in a memory device of the host vehicle. The host vehicle utilizes the respective cryptographic key to decrypt or encrypt a secure message transmitted between the host vehicle and the remote vehicle. The respective cryptographic key temporarily stored in the memory device of the host vehicle is deleted after the vehicle-to-vehicle communications of the host vehicle is disabled.

17 Claims, 4 Drawing Sheets

ON-DEMAND SECURE KEY GENERATION IN A VEHICLE-TO-VEHICLE COMMUNICATION NETWORK

BACKGROUND OF INVENTION

An embodiment relates generally to vehicle security systems in a vehicle-to-vehicle (V2V) communication network.

Key cryptography is a method where a key is provided to determine a function output of a cryptographic algorithm or cipher. The key typically identifies a particular transformation of some type of cipher into a non-ciphered code during decryption and vice versa during encryption.

In a vehicle security system, skilled attackers who break into vehicles can obtain details of the cryptographic algorithm or the algorithm itself readily from a storage device if the cryptographic key and cryptic codes are stored in the vehicle. Without the key, the cryptographic algorithm provides no details or output. Therefore, it is imperative to keep the key safe; however, that has proven to be a difficult task as a key stored in some memory of the vehicle is always at risk of being stolen by an attacker attempting to gain access to the vehicle. If the attacker can gain access to both the key and the algorithm, then the attacker can access secure operations of the vehicle. Therefore, there is a demand for an enhanced security system when using a decryption key for security purposes to enable secure vehicle operations.

SUMMARY OF INVENTION

An advantage of an embodiment is a deterrent of an attacker from gaining access to secure vehicle applications which utilize secure messages transmitted in a V2V communication system. The attacker is thwarted from stealing the cryptographic algorithm or contents of the cryptographic algorithm by deleting the cryptographic key temporarily stored in the host vehicle when V2V communications are disabled. A new key is generated upon enablement of the V2V communications using a unique identifier that is associated with the individual, or the vehicle, or combination of both.

An embodiment contemplates a method of generating on-demand cryptographic keys in a vehicle-to-vehicle communication system. A vehicle start operation is enabled for a host vehicle. At least one unique identifier is obtained relating to a user of the vehicle. The host vehicle generates cryptographic keys for encrypting, decrypting, and authenticating secured messages between the host vehicle and at least one remote vehicle in the vehicle-to-vehicle communication system in response to enabling the vehicle start operation. The cryptographic keys are generated as a function of the at least one unique identifier. A respective cryptographic key used to decrypt or encrypt messages communicated between the host vehicle and the at least one remote entity is temporarily stored in a memory device of the host vehicle. Vehicle-to-vehicle communications are enabled with the at least one remote entity. The host vehicle utilizes the respective cryptographic key to decrypt or encrypt a secure message transmitted between the host vehicle and the remote vehicle. The respective cryptographic key temporarily stored in the memory device of the host vehicle is deleted after the vehicle-to-vehicle communications of the host vehicle is disabled.

An embodiment contemplates an on-demand cryptographic key generation system for vehicle-to-vehicle communications. The vehicle-to-vehicle communications are enabled upon a vehicle start operation. An identification input device obtains at least one unique identifier corresponding to a user of the host vehicle that is used by the host vehicle to generate the set of cryptographic keys. A host vehicle processing unit generates cryptographic keys used to encrypt, decrypt, and authenticate secured messages between a host vehicle and at least one remote vehicle in response to enabling the vehicle start operation. The cryptographic keys are generated as a function of the at least one unique identifier. A vehicle-to-vehicle communication system transmits and receives secure messages between the host vehicle and the remote vehicle. The vehicle-to-vehicle communication system is enabled upon the start operation. A memory device temporarily stores at least one respective cryptographic key generated by the host vehicle. A secure message is generated between the host vehicle and the remote vehicle. The at least one cryptographic key stored by the host vehicle is used to decrypt or encrypt the secure message. The respective cryptographic key temporarily stored in the memory device is deleted from the memory device after the vehicle-to-vehicle communications of the host vehicle is disabled.

DETAILED DESCRIPTION

Figure 1:
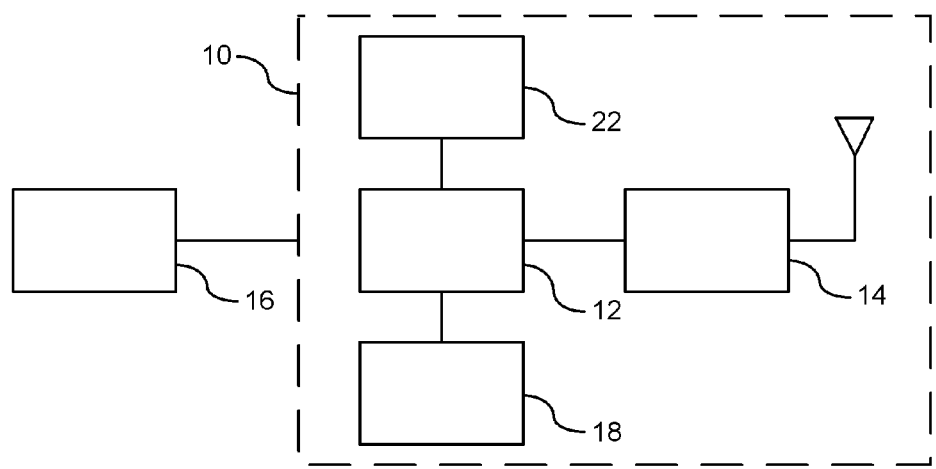
FIG. 1 is a block diagram of an on-demand cryptographic key generation system.

There is shown in FIG. 1 a block diagram of an on-demand cryptographic key generation system 10 used in a vehicle-to-vehicle communication network. The system 10 includes a host vehicle processing unit 12 that includes an algorithm for generating cryptographic keys that are used to encrypt, decrypt, and authenticate secured messages between a host vehicle and a remote vehicle/entity. The host vehicle processing unit 12 may be an on-board processing unit (OBU) is an embedded computer for controlling all vehicle-to-vehicle (V2V) communications and the associated security for the V2V communications. The system further includes a vehicle-to-vehicle (V2V) transmitting and receiving module 14 for transmitting and receiving message from other vehicles. V2V communication applications relate to co-operative communications for a vehicle based on two-way communications for interacting in real time. These systems are preferably directed to traffic management, collision warning, and collision avoidance. Such systems can extend a host vehicle's range of awareness of surrounding environmental conditions by providing relevant information regarding the status of traffic in addition to any safety related events occurring in proximity to or detected by vehicles near the host vehicle.

The vehicle includes an ignition start system 16 for starting a vehicle engine. V2V communications is enabled upon the start of the vehicle engine. V2V communications 14 can be disabled when the engine is turned off or may stay in an enabled state for a predetermined duration of time after the vehicle engine is turned off. Maintaining active V2V communications for a time period after the vehicle is turned off may avoid having to regenerate new keys when it is not desired, such as the use in electric or hybrid vehicles when the vehicle is at a stop light or other temporary rest. Therefore, generating new cryptographic keys in instances where the engine is momentarily disabled, such as at a stop light, in not desired since this is not a time when the cryptic algorithm would be subject to an attack and generating new keys would be of no benefit; rather, the concern is when the user has left the vehicle where an attacker can attempt to access the vehicle. Preferably, the cryptographic keys are maintained for the duration of time when the V2V communications are enabled which is a predetermined period after the engine is off which accounts for momentary engine shut down and startups.

Figure 2:
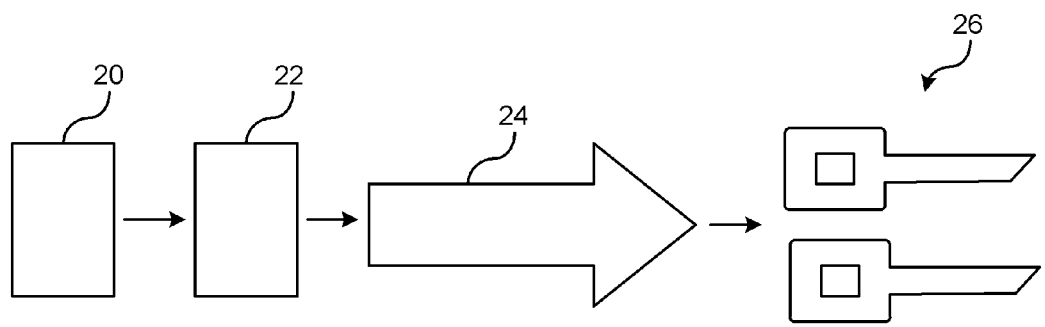
FIG. 2 is a broad overview of block diagram for generating cryptographic keys.

FIG. 2 illustrates a block diagram for generating cryptographic keys. A set of unique identifiers 20 is used to generate the keys. This provides authentication that the entity requesting the generation of the keys is the authorized. The unique identifier is similar to a password that is unique to the user. An identification input device 22 (also shown in FIG. 1) is used to enter the user's unique identifier 20. The identification input device 22 may be a keypad or similar that allows the user to enter a code. In addition, the input device 22 may include a biometric sensing device for sensing and obtaining one or more biometric characteristics of the user, or may include a portable personal device carried by the user that maintains unique identification of the user that may be wirelessly transmitted to the processing unit of the host vehicle. The biometric sensing device may include, but is not limited to, a fingerprint scan device for scanning fingerprints, a retinal scan device for scanning a retina or iris, a voice recognition device for identifying a voice pattern, or facial recognition device for identifying facial characteristics of the user. It should be understood that one input or a plurality of inputs may be used to verify the identity of the user. As a result, the more unique identifier inputs used to generate the key, the greater the security of the system.

After each unique identifier 20 is confirmed, a one way function 24 is used to generate the cryptographic keys 26. The one way function 24 uses the unique identifier 20 and a set of known parameters to generate the cryptographic keys 26. The one way function generates the keys such that is nearly impossibly to invert or reverse engineer an associated key, such as a private key in asymmetric key algorithms.

The cryptographic keys may be generated for a public key infrastructure (PKI) that includes a private key and a public key or for a symmetric key infrastructure (SKI) that includes substantially identical keys. Substantially identical keys as described herein are either identical keys or keys where only a simple transformation is required to go between the two keys.

Figure 3:
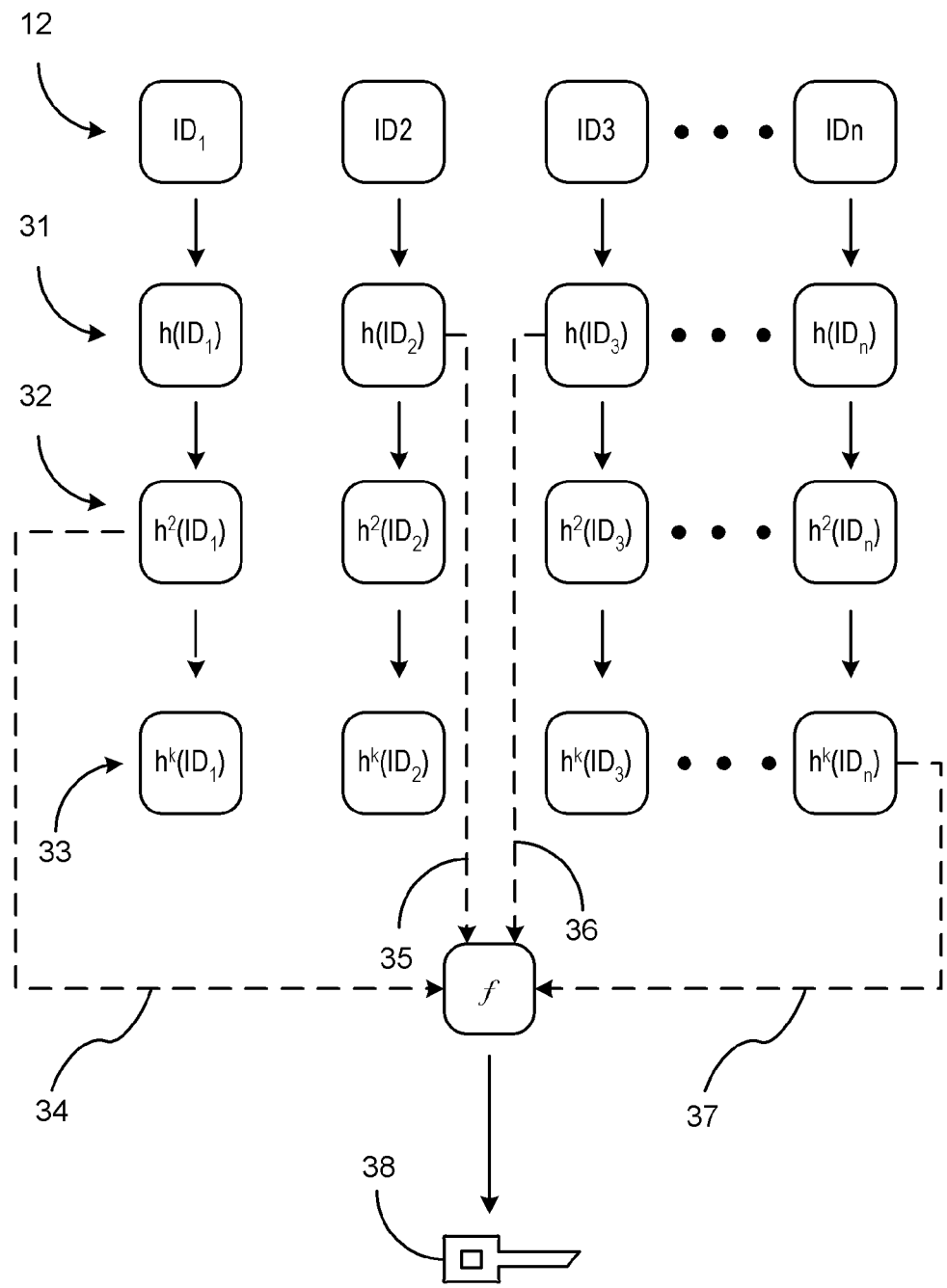
FIG. 3 is a block diagram for generating cryptographic keys using hash values.

FIG. 3 represents an exemplary cryptographic key generation technique using unique identifiers corresponding to a user of the vehicle. Typically, in V2V communications, security is based on Elliptic Curve Cryptography methods or variants thereof, such as Elliptic Curve Digital Signature Algorithm (ECDSA), which is used for generation and verification of messages exchanged in V2V communications. It should be understood, however, that a communication exchange involving a sender (e.g., who signs the message) and a receiver (e.g., who verifies the message), can be successfully executed only if the sender and the receiver have mutual agreement on a set of parameters for use in the communication exchange. For example, if the sender uses 256 bit keys for signing a message, then the recipient must also use 256 bit keys. As a result, a common set of parameters must be agreed on that typically includes: (i) type of curve to be used, (ii) F_p a finite field of an order p, (iii) G, a base point, (iv) n, a prime number representing a range of the Finite Field F or an order p. A private cryptographic key d may be generated by the sender based a set of parameters described herein. Under ECDSA, the private cryptographic key d is virtually any number in the range $\{1, n-1\}$. Since n is sufficiently large, guessing the value of d is hard or computationally intractable.

To derive the private cryptographic key d, unique identifiers are obtained from one or more identification input devices on an on-demand basis. The unique identifiers may be obtained by various devices and techniques described earlier. The extracted unique identifiers are then converted by an algorithm to a private cryptographic key required for V2V communication. A set of unique identifiers obtained from a user is shown in the row designated generally by 30 (i.e., $ID_1, \ldots, ID_2$). Depending on the number of identifiers and the bits making of each identifier determines the number of combinations available to select from for generating the hash functions. For example, let $ID_1$ represent an iris biometric, $ID_2$ represent keypad input, and $ID_3$ represent cell phone interface. $ID_1$ has an entropy of 44 bits, $ID_2$ has an entropy of 32 bits, $ID_3$ has an entropy of 32 bits. The total entropy is 108 bits assuming that all identifiers employed are statistically independent (i.e., the outcome of one identifier does not in anyway influence the outcome of the other identifiers). The total number of combinations available to select from for generating the private cryptographic key using the three unique identifiers is $2^{108} = 3.25 \times 10^{32}$.

The rows generally designated by 31-33 illustrate a plurality of hashes generated for each identifier. Multiple hashes are generated using a one way function by hashing over the each identifier repeatedly to generate k such hashes. For example, hashes are generated for the all the identifiers $ID_1, \ldots, ID_n$ and are represented by row 31. Hashes are repeatedly generated for all the identifiers $ID_1, \ldots, ID_n$ and are represented by row 32. Hashes may be repeatedly generated for all identifier combinations as desired and is represented by row 33.

After the desired number of hashes is computed, a subset of all the computed hashes is selected for generating a private cryptographic key. In the example shown in FIG. 3, hashes 34-37 are selected from each identifier to form a subset. A function $f$ 38 translates each of the selected identifiers into a private key. The vehicle host processing unit utilizes an identification code that is not published to select the subset. Alternatively, the identification code may be derived from an external interface to select the subset of multiple hashes. For example, if the selection process uses a single digit scheme for determining which hash to use, then for the identification code is 465474543 the following hashes are selected: the $4^{th}$ hash from $ID_1$ is selected, the $6^{th}$ hash from $ID_2$ is selected, and the $5^{th}$ hash from $ID_3$ is selected. The routine continues selecting hashes until either all identifiers are used or until each of the digits have been used from the identification code. It should be understood that the routine may select less hashes than the number of digits in the identification code. Another example of the selection process is using a double digit scheme for determining selecting each hash. Using the identification code 465474543 the following hashes are selected with the double digit scheme, the following hashes are selected: the $46^{th}$ hash is selected from $ID_1$, the $54^{th}$ hash is selected from $ID_2$, and the $74^{th}$ hash is selected from the $ID_3$. The routine continues selecting hashes until either all identifiers are used or until each of the digits have been used from the identification code. It should be understood that the embodiments described herein does not set forth a specific rule as to the selection process of the hashes, and that any selection process may be used herein.

In block 39, the private key is generated by concatenating the selected hash values. The selected hash value for $ID_1$ is appended to the selected hash value of the $ID_2$. The next selected hash values are successively appended. After all the selected hash values are appended, mod (n) of the concatenated hash value is computed. The mod operation results in a number between 1, . . . , n−1, which is realized as the private cryptographic key. The private cryptographic key may then be used to generate the public cryptographic key. All messages transmitted while the V2V communications of the host vehicle remains active will use this private-pubic key pair.

Figure 4:
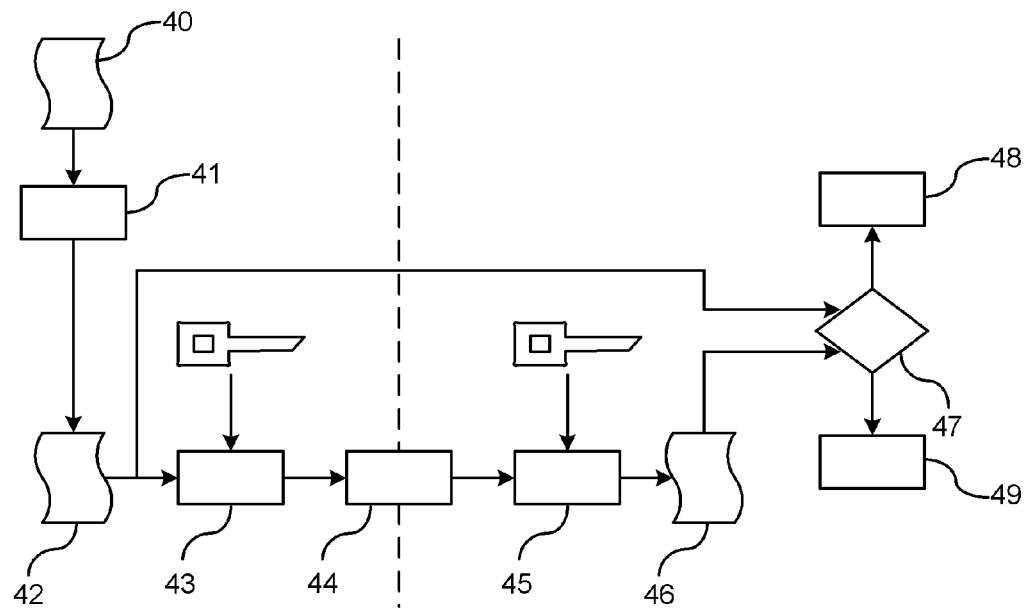
FIG. 4 is a block diagram of a PKI infrastructure encryption/decryption technique.

FIG. 4 illustrates a PKI technique. For PKI, a private key is generated and a public key is generated. The host vehicle retains the private key and other entities communicating with the host vehicle retain a public key. In block 40, a message is generated by a sender using the public key. The public key may also be registered with a certificate authority for generating a corresponding certificate. The certificates may be encrypted prior to being sent to holder of the private key.

In block 41, a message digest algorithm (also referred to as a hash function) is applied to the message for generating a message digest 42. The message digest 42 is used to check the integrity of the message transmitted. This procedure takes an arbitrary block of data and generates a bit string that is of a fixed size. The length of the message does not matter for the return string. That is, the message could be a single word or any number of words (e.g., 500 words) and the return string generated could be the same size. The data encoded is referred to as the message and the return values are referred to as the hash value. If any accidental or intentional changes occur to the data, then the hash value is changed and it recognized by the recipient that tampering has occurred with the data.

In block 43, the sender uses the public key to encrypt the message digest. The encryption algorithm encrypts the message so that only the person with an associated private key can decrypt the encrypted message digest.

In block 44, the encrypted message digest is transmitted to the recipient.

In block 45, the private key that is maintained by the host vehicle is used to decrypt the encrypted message digest.

In block 46, the decrypted message digest is prepared for comparison with the hash value.

In block 47, the decrypted message digest is compared to the hash value provided by other means to the recipient for comparison purposes. If the hash values are equal, then the message was transmitted correctly without tampering as identified by block 48 and is used for vehicle application processing. If the hash values are unequal, then the message is identified as being tampered in block 49. It should be understood that any asymmetric key algorithm can be utilized as described above and PKI is only one of the many techniques that can used herein. For example, digital signature algorithm, may be used where the sender uses a private key to sign the digital message and the public key is used to authenticate the signature thereby confirming that the sender is the authorized entity it purports itself to be.

Figure 5:
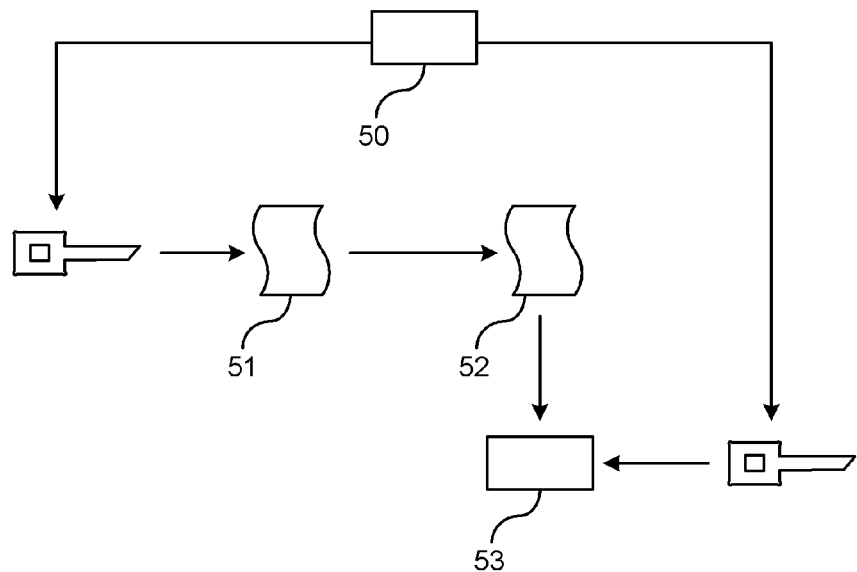
FIG. 5 is a block diagram of a SKI infrastructure encryption/decryption technique.

FIG. 5 illustrates an example of a symmetric key infrastructure (SKI). In block 50, a processing unit generates a pair of symmetric keys. A first key is retained by the host vehicle and second identical key is provided to a recipient (remote vehicle).

In block 51, the message is encrypted using the host vehicle encryption key. In block 52, the message is transmitted to the recipient.

In block 53, the message is decrypted using the symmetric key maintained by the recipient.

In utilizing either the PKI or SKI techniques, the key held in possession by the host vehicle is only maintained for as long as the V2V communications is enabled by the host vehicle. Once it is determined that V2V communications are not required by the host vehicle, the current cryptographic key held by the processing unit or storage device is deleted. As a result, the encryption key of the host vehicle is no longer available for the attack to gain access to, and therefore, access to vehicle encryption algorithm is prevented. Since the public key is only valid with the associated private key, an attacker obtaining the public key gains no benefit since the private key associated with that respective public key cannot be regenerated from the public key. If the host vehicle requires V2V communication again, the processing unit of the host vehicle will generate a new set of cryptographic keys when the V2V communication module is enabled that replaces the previous set of keys. The benefits of the embodiments described herein are that computing platforms will not be tampered with in search of keys. The unique identifiers that are used to generate the keys are associated with the individual, not the vehicle. As a result, repudiation is stronger. In the event of a loss of a public key, this is easily corrected by downloading and storing a new certificate to the vehicle from the certificate authority affirming the linking relationship between the private key and the public key.

Figure 6:
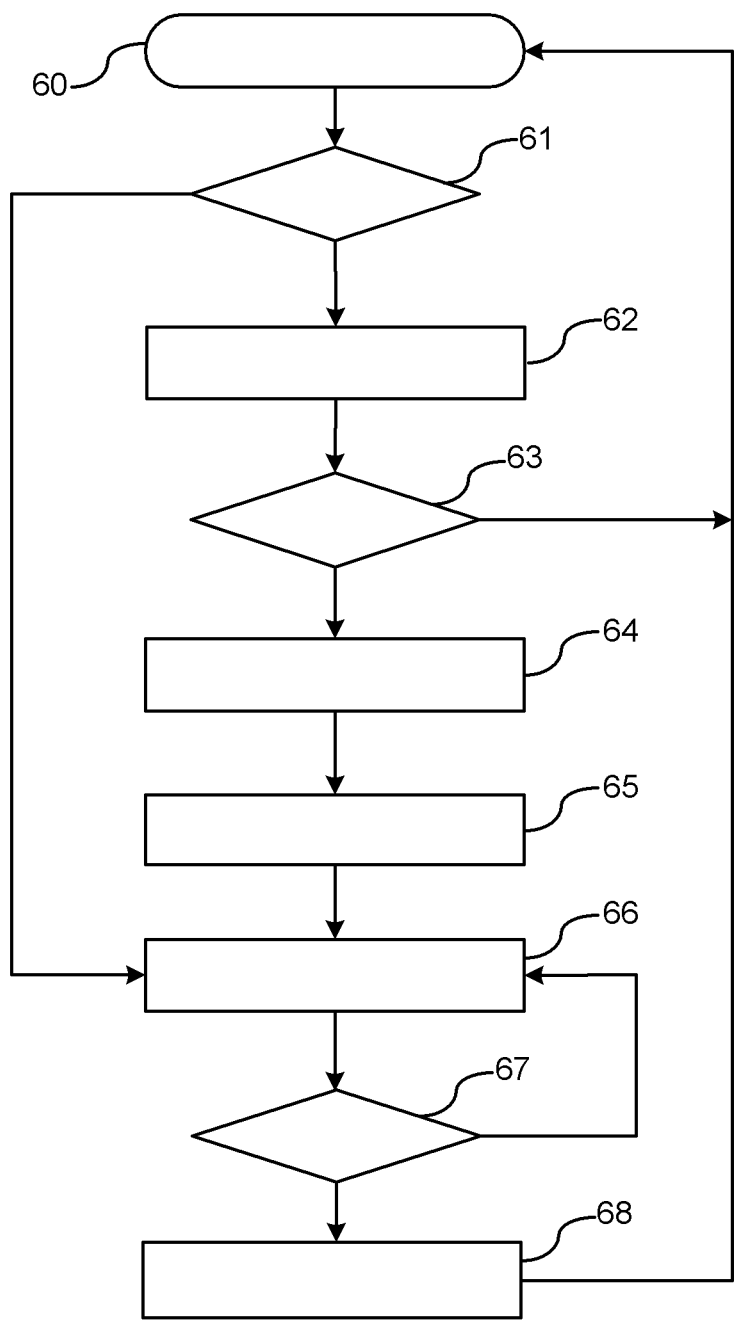
FIG. 6 is a flowchart of a method for a V2V communication messaging protocol.

FIG. 6 illustrates a flowchart of a method for a V2V communication messaging protocol. In step 60, a vehicle startup operation is detected.

In step 61, a determination is made whether the V2V communications is already enabled. If V2V communications is already enabled, then the routine proceeds to step 66, otherwise, the routine proceeds to step 62. Advancing to step 66 occurs when a vehicle temporarily shuts the vehicle engine off and restarts the vehicle engine prior to disabling the V2V communications.

In step 62, the user enters one or more unique identifiers. The unique identifiers may be manually entered by the user or an identification device may automatically detect the user's characteristics.

In step 63, a determination is made whether the unique identifiers validate the user. If the user is not validated, then a return is made to step 60. If the user is validated, then the routine proceeds to step 64.

In step 64, a new set of cryptographic keys are generated as a function of the unique identifiers using a one way function or similar.

In step 65, one of the cryptographic keys (e.g., the private key) is maintained by the host vehicle. The other cryptographic key(s) (e.g., public keys) are provided to the remote vehicle(s).

In step 66, the cryptographic key maintained by the host vehicle is used to decrypt and authenticate messages that are communicated from remote vehicles within the V2V communication system.

In step 67, a determination is made whether the host vehicle's V2V communications is still enabled. Disabling the host V2V communications may be performed after certain events including, but not limited to, turning off the vehicle engine or a predetermined time period after the vehicle engine is turned off. If the determination is made that the V2V communication for the host vehicle is still enabled, then the routine returns to step 66 to decrypt and authenticate a next transmitted message by a remote vehicle. If the determination is made that the V2V communication for host vehicle is disabled, then the routine proceeds to step 68.

In step 68, the current cryptographic key maintained by the host vehicle is deleted. A return is then made to step 60.

While certain embodiments of the present invention have been described in detail, those familiar with the art to which this invention relates will recognize various alternative designs and embodiments for practicing the invention as defined by the following claims.

What is claimed is:

1. A method of generating on-demand cryptographic keys in a vehicle-to-vehicle communication system comprising:
enabling a vehicle start operation for a host vehicle;
obtaining at least one unique identifier relating to a user of the host vehicle;
the host vehicle generating cryptographic keys for encrypting, decrypting, and authenticating secured messages between the host vehicle and at least one remote entity in the vehicle-to-vehicle communication system in response to enabling the vehicle start operation, the cryptographic keys being generated as a function of the at least one unique identifier, the cryptographic keys including a private cryptographic key and a public cryptographic key, wherein a plurality of unique identifiers are obtained corresponding to the user, wherein multiple hashes are obtained for each unique identifier using a one way function, and wherein a subset of the multiple hashes are selected for generating the private cryptographic key;
temporarily storing a respective cryptographic key used to decrypt or encrypt messages communicated between the host vehicle and the at least one remote entity in a memory device of the host vehicle;
enabling vehicle-to-vehicle communications with the at least one remote entity, wherein the host vehicle utilizes the respective cryptographic key to decrypt or encrypt a secure message transmitted between the host vehicle and the at the least one remote entity; and
deleting the respective cryptographic key temporarily stored in the memory device of the host vehicle after the vehicle-to-vehicle communications of the host vehicle is disabled.

2. The method of claim 1 wherein the public cryptographic key is generated using the private cryptographic key.

3. The method of claim 1 wherein the at least one unique identifier is associated with the user of the host vehicle.

4. The method of claim 3 wherein the at least one unique identifier includes at least one biometric characteristic corresponding to the user of the host vehicle.

5. The method of claim 1 wherein the at least one unique identifier includes a code entered by the user of the host vehicle.

6. The method of claim 1 wherein the at least one unique identifier is obtained passively from the user of the host vehicle.

7. The method of claim 1 wherein messages transmitted within the vehicle-to-vehicle communication system are encrypted and decrypted using a public-key infrastructure technique, wherein the cryptographic keys include a private cryptographic key and a public cryptographic key, wherein the private cryptographic key is temporarily stored in the memory device of the host vehicle and the public cryptographic key is provided to the at least one remote entity.

8. The method of claim 7 wherein a certificate authority is used to certify ownership of the public cryptographic key, wherein the certificate authority registers the public cryptographic key and generates a corresponding certificate for the public cryptographic key, wherein the certificate authority encrypts the corresponding certificate, and wherein the certificate authority provides the encrypted certificate to the host vehicle, wherein the host vehicle decrypts the encrypted certificate with the private cryptographic key for use when communicating secure messages.

9. An on-demand cryptographic key generation system for vehicle-to-vehicle communications, the vehicle-to-vehicle communications being enabled upon a vehicle start operation, the on-demand cryptographic key generation system comprising:
an identification input device obtaining at least one unique identifier corresponding to a user of the host vehicle is used by a host vehicle to generate a set of cryptographic keys;
a host vehicle processing unit for generating cryptographic keys used to encrypt, decrypt, and authenticate secured messages between the host vehicle and a remote vehicle in response to enabling the vehicle start operation, the cryptographic keys being generated as a function of the at least one unique identifier, the host vehicle processing unit obtaining a plurality of unique identifiers, wherein multiple hashes are generated for each unique identifier, wherein a subset of the multiple hashes are selected for determining a private cryptographic key, and wherein the private cryptographic key is used by the host vehicle processing unit to generate a public cryptographic key;
a vehicle-to-vehicle communication system for transmitting and receiving secure messages between the host vehicle and the remote vehicle, the vehicle-to-vehicle communication system being enabled upon the vehicle start operation; and
a memory device for temporarily storing at least one cryptographic key generated by the host vehicle;
wherein a secure message is generated between the host vehicle and the remote vehicle, wherein the at least one cryptographic key stored by the host vehicle is used to decrypt or encrypt the secure message, and wherein the respective cryptographic key temporarily stored in the memory device is deleted from the memory device after the vehicle-to-vehicle communications of the host vehicle is disabled.

10. The system of claim 9 wherein the identification input device includes a device for entering a code by the user of the host vehicle.

11. The system of claim 9 wherein the identification input device includes at least one biometric sensing device for obtaining at least one biometric characteristic of the user of the host vehicle for identifying the user.

12. The system of claim 11 wherein the at least one biometric sensing device includes a fingerprint scan device.

13. The system of claim 11 wherein the at least one biometric sensing device includes a retinal scan device.

14. The system of claim 11 wherein the at least one biometric sensing device includes a voice recognition device.

15. The system of claim 11 wherein the identification input device includes a personal portable device carried by a user that wirelessly communicates with the host vehicle for providing a unique identifier.

16. The system of claim 9 wherein the host vehicle processing unit is an on-board unit of the host vehicle that controls vehicle-to-vehicle communications and security.

17. A method of generating on-demand cryptographic keys in a vehicle-to-vehicle communication system comprising:
enabling a vehicle start operation for a host vehicle;
obtaining at least one unique identifier relating to a user of the host vehicle;
the host vehicle generating cryptographic keys for encrypting, decrypting, and authenticating secured messages between the host vehicle and at least one remote entity in the vehicle-to-vehicle communication system in response to enabling the vehicle start operation, the cryptographic keys being generated as a function of the at least one unique identifier, the cryptographic keys including a set of substantially identical cryptographic keys that each provide encrypting and decrypting functionality using a symmetric-key infrastructure technique, wherein the host vehicle retains a first of the substantially identical cryptographic keys and the remote vehicle retains a second of the substantially identical cryptographic keys, wherein unique identifiers are obtained corresponding to the user, wherein multiple hashes are obtained for each unique identifier using a one way function, and wherein a subset of the multiple hashes are selected for generating the substantially identical cryptographic keys;

temporarily storing a respective cryptographic key used to decrypt or encrypt messages communicated between the host vehicle and the at least one remote entity in a memory device of the host vehicle;

enabling vehicle-to-vehicle communications with the at least one remote entity, wherein the host vehicle utilizes the respective cryptographic key to decrypt or encrypt a secure message transmitted between the host vehicle and the at the least one remote entity; and deleting the respective cryptographic key temporarily stored in the memory device of the host vehicle after the vehicle-to-vehicle communications of the host vehicle is disabled.

* * * * *